(12) United States Patent
Janssen et al.

(10) Patent No.: US 6,801,638 B1
(45) Date of Patent: Oct. 5, 2004

(54) DEVICE AND METHOD FOR RECOGNIZING TRAFFIC SIGNS

(75) Inventors: Reinhard Janssen, Ulm (DE); Frank Lindner, Blaustein (DE); Berthold Ulmer, Esslingen (DE)

(73) Assignee: DaimlerChrysler AG (DE)

( * ) Notice: Subject to any disclaimer, the term of this patent is extended or adjusted under 35 U.S.C. 154(b) by 0 days.

(21) Appl. No.: 09/831,803

(22) PCT Filed: Nov. 13, 1999

(86) PCT No.: PCT/DE99/03628

§ 371 (c)(1),
(2), (4) Date: May 14, 2001

(87) PCT Pub. No.: WO00/30056

PCT Pub. Date: May 25, 2000

(30) Foreign Application Priority Data

Nov. 14, 1998 (DE) .......................... 198 52 631

(51) Int. Cl.$^7$ ................................ G06K 9/00
(52) U.S. Cl. ................ 382/104; 340/910; 340/917; 340/918; 701/117; 701/118
(58) Field of Search ................ 382/100, 104, 382/107, 154, 199; 340/901, 902, 903, 904, 905, 906, 907, 938, 988, 438, 439, 990; 701/29, 36, 40, 41, 44, 70, 93, 96, 98, 116, 117, 225; 348/113, 149

(56) References Cited

U.S. PATENT DOCUMENTS 5,420,794 A * 5/1995 James .................. 701/117
6,249,375 B1 * 6/2001 Silhengst et al. ........... 359/362
6,285,393 B1 * 9/2001 Shimoura et al. ........... 348/119
6,453,056 B2 * 9/2002 Laumeyer et al. .......... 382/104
6,459,387 B1 * 10/2002 Kobayashi et al. ......... 340/988
6,556,692 B1 * 4/2003 Gavrila ...................... 382/104

OTHER PUBLICATIONS

Piccioli G, De Micheli E Parodi P Campani M: "Robust method for road sign detection and recognition". Image and Vision Computing 14 (1996), pp. 209–223.

"Das Computer–Auge". Münchner Merkur No. 254, Nov. 4, 1998, p. A1 (in German).

"Computer erkennt Verkehrszeichen". RFE 2, 1997, p. 7 (in German).

* cited by examiner

Primary Examiner—Jayanti K. Patel
Assistant Examiner—Abolfazl Tabatabai
(74) Attorney, Agent, or Firm—Pendorf & Cutliff

(57) ABSTRACT

The invention concerns a process and a device, which make it possible to reliably, with the least amount of computing power, recognize traffic signs and to display these as memory aids for an observer. Image data of an image sensor are analyzed and classified in an information processing unit, and on the basis of the results classification image segments and/or symbolic image representing data stored in a memory unit are recorded in a memory unit and are displayed by means of a display unit. In the further processing of the image data, extracted objects are separated and classified into traffic sign specific upper classes and lower classes. Subsequently, a synthetic image of a traffic sign is generated, stored in a memory unit, and displayed by means of a display unit.

62 Claims, 1 Drawing Sheet

DEVICE AND METHOD FOR RECOGNIZING TRAFFIC SIGNS

BACKGROUND OF THE INVENTION

The invention concerns a device and a method for recognizing traffic signs.

Traffic on streets, railways, navigable waterways and airfields is regulated-by traffic signs. The traffic regulations referenced by the traffic signs frequently have a geographic limitation which extends over segments of the traffic pattern, after which the vehicle operator need no longer consider the traffic sign. Such segments are marked, for example, by a traffic sign which indicates the beginning of the applicability of the regulation, and a further traffic sign which indicates the lifting of the applicability of the regulation. For the vehicle operator it would be very helpful to have a memory aid, which would provide him with information regarding the content of the traffic sign (to which obedience is being required), and particularly those for which a long period of time has lapsed since the sign was passed.

DESCRIPTION OF THE RELATED ART

In the previous state of the art devices and methods have been proposed, which have the objective of completely extracting the information content of the traffic sign.

For example, in patent document DE 36 19 824 C2 a device is proposed for aiding the memory of a vehicle operator, which detects the speed limit by recognition of the traffic sign and indicates this within the cabin of the vehicle for the duration of its applicability. This device includes an image sensor, an information-processing unit, a memory unit and an indicator unit. By means of the image sensor images are detected or recorded from the traffic lane ahead of the vehicle. By means of the information-processing unit these images are examined in real time for traffic signs and upon recognition of a traffic sign the content thereof, in this example a speed limit, is extracted. The extracted value of the highest permitted speed is stored in the memory unit and indicated on the indicator unit for the duration of validity, that is, until recognition of a traffic sign which removes the restriction.

The disadvantage of this device is comprised in the high error rate for non-recognized traffic signals and its high cost. The actual recognition of a particular traffic sign, that is, the extraction of its complete information content, with a sufficiently high confidence requires high quality color images and a highest possible resolution (Janssen et al., "Hybrid Approach of Traffic Sign Recognition", Proc. Intelligent Vehicle Symposium, Tokyo, Japan, pp. 390–395, 1993). The evaluation of such images in real time requires a very high computer power. Image sensors and information processing units having such high power are expensive. And even with these the error quotient for various traffic sign recognition systems is in the magnitude of several percent. Such error quotients cannot be tolerated for warranty and/or insurance reasons.

In order to minimize the workload on the computers, it is proposed in the document DE 197 36 774 A1, that after the detection of a traffic sign within a camera segment, this is extracted therefrom and indicated. The indication or display occurs without previously evaluation of the content of the traffic sign and without prior classification. The disadvantage of this process lies in the fact that no workup or processing of the traffic sign image occurs. This has the consequence, that in poor visibility conditions the observer requires increased care and attention to be able to recognize and understand the traffic signs displayed to him.

The task of the present invention is thus comprised on the one hand of finding a process and a device which make it possible to reliably, with as low as possible computer load and thus economically, to recognize traffic signs and to provide a display to an observer as a reminder or aid. Herein the error rate in the framework of the recognition of the object identified as a traffic sign should be kept as low as possible.

SUMMARY OF THE INVENTION

The task is solved by the process or, as the case may be, the appropriately designed device, in which the image data from the image sensor is analyzed and classified in an information processing unit, and on the basis of the results is recorded in memory as a class-specific image segment and/or a symbolic figure representing an image stored a memory unit, which is then displayed by means of the display unit. Therein, in the framework of the analysis, the information-processing unit it is determined whether the image data of the image sensor contains one or more objects, which, with sufficiently high probability, are traffic signs. Consequently, the so detected objects are forwarded to a further processing and classification step. In a particularly advantageous manner, in the framework of the invention, during the further processing of the image data of the objects, a separation is undertaken into traffic sign specific upper classes and lower classes. Thereby, appropriate classification specific characteristic data are extracted and relayed to a separate classification. Depending on whether the classification specific characteristic data are correctly recognized with high probability during the classification, they are replaced by the corresponding or appropriate symbolic image representing image data stored in the storage unit or by the appropriate original image data stemming from the image sensor. The image data resulting from the dissections are recombined into a synthetic image of a traffic sign and this image is then stored in the memory unit and brought to; the display by means of the display unit.

An important advantage of the invention is comprised therein, that it is no longer necessary to carry out the computer taxing and with high error quotient associated problem of classification of a relatively complex traffic sign which must be solved over its entirety, rather the problem, by separation of the detected objects into traffic sign specific upper classes and lower classes in a preceding classification process, is dissected or redirected to clearer and therewith simpler classification problems. Therewith in like measure the demands on the necessary computing power and the image quality are reduced.

DETAILED DESCRIPTION OF THE INVENTION

Figure 1:
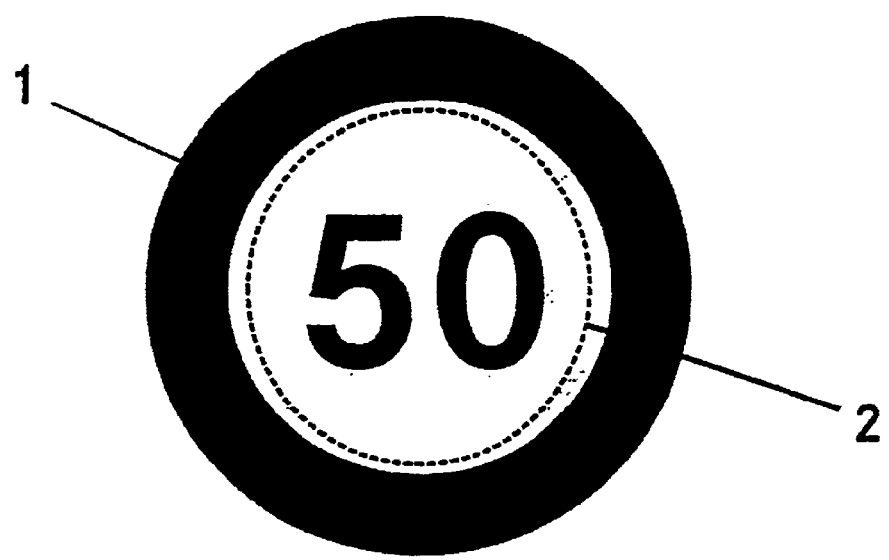
FIG. 1 is a diagrammatic illustration of a European speed limit sign.

As shown in FIG. 1 an example will be given for the separation of the traffic sign into traffic sign specific upper classes 1 and lower classes 2. The traffic sign shown in FIG. 1 is a speed limit indicating sign. The traffic sign specific upper class 1 of this traffic sign belongs to the class of regulating signs, which have a characteristic round shape with an internal symbol therein. In this special cases of a traffic speed limiting sign, the integrated symbol is a number which is circumscribed by a broad, red ring. In the case of this traffic speed limit indicating sign the internally lying symbol, that is the indication as to the speed to which a vehicle speed is to be limited, is an element of the traffic sign specific lower class 2.

Another important group of traffic signs are warning signs. Here the traffic signs specific upper class 1 is defined by a triangular shape of the traffic sign and the internally lying danger symbol, which is surrounded by a broad, red triangle. The element of the traffic sign specific lower class 2 is formed by the internally lying danger symbol.

In accordance with the invention it should now be possible with comparatively low computer power and with low equipment expense (for example, a monochrome camera instead of a high resolution color camera) to check in real time whether the object of a particular shape within the detected or observed image is an actual traffic sign. If this is the case, then the classification specific characteristic data of the object are supplied to a separate classification for identification of the traffic sign.

In an advantageous embodiment of the invention a hierarchically organized classifier is employed for identification of the traffic sign. The classification occurs therein in multiple steps. For this, first the characteristic data or features associated with the upper class of the object are supplied to the classification. If a classification occurs successfully (that is, the class could be correctly recognized with high confidence), then the characteristic data are replaced by the appropriate symbolic representation of the object stored in the memory unit. If the classification is unsuccessful (that is, the class could not be recognized with high confidence), then the characteristic data of the upper class and the characterizing data of the lower class are replaced by the original image data originally stemming from the image sensor and the image classification process is ended. A further step within the classification procedure is initiated when the classification of the upper class was successful. In this case, the characterizing data belonging to the lower class of the object are subsequently supplied to a classifier. In the case of successful classification of this lower class (that is, the class could be recognized with high confidence), then the characterizing data are replaced by the appropriate or corresponding symbolic representation of the lower class stored in the memory unit. On the other hand, in the case of unsuccessful classification (that is, the class could not be recognized with high confidence) the characterizing data of the lower class is replaced by the corresponding original image data stemming from the image sensor.

With this hierarchical process a low error rate traffic sign recognition is provided. Therein both hierarchical steps for identification of the upper class or as the case may be the identification of the lower class may themselves again be hierarchically organized. With respect to the design of the classifiers employed within the hierarchical classification it is conceivable to so design these, that they make decisions on the basis of a comparison of the distance of the characterizing data supplied to them from the class typical characterizing data sets stored in the memory unit. Thereby the traffic sign identifying object is assigned to that respective upper class, to which the distance in the measurement space is the lowest. Thereby it is possible to so define a tolerance threshold which is compared with a minimal distance value, wherein the distance value falling below the tolerance threshold serves as indicator to a high probability of correct occurrence of recognition. In another advantageous design it is also possible to so design the classifiers, that they can be trained with the aid of a traffic sign specific learning succession of passes. This process is particularly advantageous, since the quality of the image data delivered by the: image sensor depends strongly upon the environmental factors such as weather and light relationships.

In the case that during the analysis of the image data from the image sensor a supplemental sign attached to the traffic sign is recognized, then in one possible embodiment of the invention this can be represented on the display unit when in the framework of the classification at least the upper class of the associated traffic sign has been identified with high confidence. The display of the supplemental image is for this reason coupled to the condition, that at least the upper class of the associated traffic sign has been recognized, in order in the case of an equivocal identification of the traffic sign the observer is not also burdened with a supplemental information. It is also to be presumed, that in the case of visibility conditions, which no longer permit a clear classification of the traffic sign, it would also not be possible to evaluate the information which is offered or presented on the supplemental image. If the necessary tasking with respect to the loading of the recognition process is to be further reduced, then it is also possible to not explicitly analyze the image data with respect to the supplemental traffic signs, but rather simply in the case, that in the framework of the classification at least the upper class of the traffic sign has been recognized, that by means of the display unit those image data are displayed, which originate from the field of the environment of the traffic sign, in which, class specific, a supplemental traffic sign would be placed. Therein no checking is to be undertaken as to the actual existence of such a supplemental traffic sign. In order to minimize in this type of a design of the invention the display of the large number of signs which have no useful information (for example as to the fact that there is actually no supplemental image present), it is advantageous in simple manner to implement a computer extensive classification, which disregards or rejects obviously useless image information and does not bring this to the display.

The analysis of the image data supplied by the image sensor with respect to the presence of one or more objects, which with sufficient confidence are traffic signs, can in one possible embodiment of the invention be organized into two process steps. In a first step, preferably on the basis of color values and/or spatial positions, the image areas are determined which with above average probability could contain traffic signs. These areas (regions of interest) are subjected to a geometric analysis in a second process step, which preferably operates a correlation process, in order to detect objects which possess predetermined shapes. In traffic sign recognition, of particular interest are round (prohibitory signs) and square (warning signs) shapes.

It is further conceivable to so optimize the inventive process in that respect, that out of a series of images, which are respectively recorded as the vehicle drives by an object recognized as a traffic sign, the best image is selected. Therein the selection is carried out on the basis of defined quality criteria, which orient themselves preferably on the basis of the size and/or the contrast and/or the brightness of the image data of the object. Only the synthetic image of a traffic sign generated on the basis of this image data is stored in the memory unit and is displayed via the display unit.

One advantage of a design of this type is comprised therein, that in this manner on the one hand the storage capacity is reduced, and on the other hand the observer has displayed to him one good image of constant quality of the traffic sign instead of a rapidly changing display of the identical traffic sign in different levels of quality. Thereby the attention of the driver is not distracted, but rather he can focus his undivided attention on the traffic and the actual information content of the traffic sign.

A further advantageous design characteristic of the mentioned process is comprised therein, that the image regions which contain traffic sign specific characteristic data are processed or prepared prior to their display in such a manner that they are easier to recognize. This is possible among other things by standardizing the size and/or contrast and/or brightness and/or color shade or tint. One advantage of a design of this type is comprised therein, that it becomes easier for the vehicle operator to recognize a specific traffic sign.

It has been found to be of advantage in accordance with the invention, when by means of a position determining unit integrated in the system, the position of one of the objects recognized as a traffic sign is determined. This position can be stored in addition to the synthetic image of the traffic sign. It is likewise conceivable to also store the condition and/or the visibility and/or the size of the respective traffic signs. This is particularly helpful in the case, that the invention is employed in the framework of traffic grid monitoring and evaluation. It may likewise be helpful when the stored data may be recalled in the case that changes in the position or in certain cases the condition of the traffic sign have occurred and the observer is to be alerted thereto via an optical or acoustic signal.

In an advantageous embodiment of the invention a program is stored in the memory unit for application or use of a decision logic, by means of which the information processing unit controls or steers the display unit in such a manner, that it displays the representation of an object recognized as a traffic sign for only so long, until a new object is recognized as a traffic sign, preferably a traffic sign of the same or in a corresponding class, and this simplified image replaces the preceding one. The advantage of this design lies therein, that the image surface of the displaying unit can thereby be designed or constructed to be very small, mainly as corresponds to the surface for display or representing of a single traffic sign. This is advantageous considering the simplification of the dashboard and the general limitation of the space available in a vehicle cockpit or dashboard.

Particularly advantageous is the preferred design or arrangement of the decision logic with respect to a traffic sign of the same or a corresponding class (for example: the class which corresponds to the class of traffic signs indicating speed limitations would be the class which removes the speed limit). Thereby although more place is used on the display unit, it is possible to display to the vehicle operator more simultaneously valid or applicable traffic signs. Thereby it is precluded, that the traffic signs cancel each other out and thus take up unnecessary space in the display unit.

In a further advantageous embodiment of the invention the display unit is supplementally provided with an adjustment unit, by means of which the maximal duration of the display of the representation of the synthesized image of the traffic sign can be adjusted. Thereby the vehicle operator can adjust the duration of the display to his personal requirements and preferences. Besides this, the division of his concentration between this display unit and other important displays in the vehicle cockpit as well as the outside traffic situation would then be limited to the duration of the display.

In a further possible embodiment of the invention concerning the display of the traffic sign a program is stored in the memory unit, which determines the distance covered between the actual vehicle position and the position of the last recognized traffic sign of a particular class of traffic signs with the aid of devices or sensors coupled with the information unit. For determining the traveled distance one could employ, for example, the vehicle tachometer or a wheel sensor for determining the traveled distance and a time clock, which is coupled to the information display unit, wherein it is conceivable to accomplish or realize the coupling under recourse to a vehicle data bus frequently already present in vehicles. It is then possible, via a program stored in the memory unit which allows application of a decision logic, to cause the information processing unit to so control the display unit, that it shows the synthesized image of the traffic sign for precisely so long, until a traveled distance preset in the memory unit has been traveled, which distance is preferably class-specific. On the other hand, it is also conceivable to store in the memory unit a program, which uses a decision logic by means of which the information processing unit so controls the display unit, that it displays the synthesized image of the traffic sign so long, until a new object is recognized as a traffic sign by the classifier, preferably as a traffic sign of the same or a corresponding class, and replaces the synthesized image representation of the previous one with this new one.

A further advantageous design feature of the invention is comprised therein, that the display unit supplementally includes an acoustic signal producer which, as soon as an object is recognized as a traffic sign, emits an acoustic signal, preferably class specific. The advantage of this design is comprised in the increased certainty that the vehicle operator will take notice of the traffic sign.

A further advantageous design feature of the invention is comprised therein, that the digital image sensor includes one or more, preferably monochrome, digital cameras which are arranged in such a manner, that their collective image field is sufficient to detect all traffic signs relevant to the path of a vehicle independent of the horizontal and/or vertical tilting of the roadway. An arrangement of cameras of this type ensures a more reliable recording of all traffic signs along a traveled path. Monochrome cameras are sufficient for the operation of the device, while at the same resolution are however significantly more economical than a color camera, or at the same price would provide a significantly higher resolution.

A particularly advantageous design of the invention results when one combines the system for traffic sign recognition with at least one map-based navigation system and/or a traffic information system, so that information originating from these sources can be made use of during the detection and/or the display of content of traffic signs. In one conceivable embodiment, communication between the systems occurs via the vehicle bus.

In advantageous manner the system for detection of traffic signs can be switched to enhanced performance when, on the basis of information which could be supplied by the map based navigation systems and/or a traffic information system, it is determined that the vehicle is passing through an area in which a reliable detection of traffic signs is problematic. Examples of such areas in which caution is to be taken include entry and departure of residential areas. There one can find signs indicating entry of a residential area and departure from a residential area, which imply speed limitations or as the case may be lifting of the speed limitations. The signs are however not round as conventional, but rather square. The signs are easily confused with commercial signs, particularly when traffic sign recognition is carried out using monochrome cameras, since here the relatively significant yellow coloration of the signs cannot be used as a recognition criteria. A further area in which particular care is to be taken is the environment of traffic influencing facilities and change or detour signs. Here one must presume special, display and arrangement of the traffic signs, for example an intense representation of the black and white parts of the traffic sign for improved night visibility. There is also an increased possibility of a suddenly occurring change or switching on of a traffic sign symbol, for example, sudden speed reduction to 120 km/h on highways. One particular type of traffic sign is a traffic light. In principle these can be classified with signs which change, since the condition of the display can change and therewith an increased observance is required. Using map based information it is however possible to operate the system with increased recognition performance for recognition of traffic signs in areas of traffic lights (intersections, train crossings).

While the above examples were concerned principally only with interaction with information from map-based navigation systems, in the following examples of situations will be presented in which increased recognition capacity or performance is required and which are advantageously associated with information originating from traffic information systems. This is essentially information that poor visibility due to fog or rain exists in certain regions traveled by the vehicle. In such a situation there is a presumption of increasingly poor contrast in the image data, so that the system for traffic sign recognition preferably must act more strongly on the contrast enhancement of the images. Preferably, information regarding traffic jams is also taken into consideration, since here advanced notification is given to the observer a useful distance in advance of the traffic jam in the framework of the display of symbols of a traffic jam, without even having to pass such a traffic sign.

By this inventive possibility of temporarily varying the performance of the traffic sign recognition system, this opens the possibility of economically realizing a system for recognition of traffic signs. It is also advantageous to provide a system which is not operating, at high performance in normal operating conditions and is thus disadvantageously overburdened and only in critical situations is completely utilized. Rather, the possibility is presented, considering modern multi-processor data processing units in combination with the vehicle internal data communication and the number of available data processors present in modern vehicles, to use the temporarily free or underutilized computer capacity for useful economic employment.

A further advantageous design characteristic of the invention is comprised therein, that in an available data memory unit, information regarding the type and/or the position and/or the condition and/or the visibility and/or the size of a recognized traffic sign is stored. Therein this data memory unit can either be associated with a map based navigation system or, as the case may be, a traffic information system, or also be a component of the system for traffic sign recognition and/or display. By the combination with this data memory unit the observer can be alerted via an acoustic or optical signal that along a previously traveled path a change in respect to the position or the presence or absence of a vehicle sign has occurred. Thereby it is possible to alert the observer to, for example, construction-site specific traffic regulations or, in the case of changed right-of-way, regulations in a crossing situation. Advantageously, in the same manner a warning signal is provided to the observer when the system for traffic sign recognition does not recognize, an actual traffic sign or cannot classify it adequately.

The invention further provides benefits when, on the basis of the map-based position determination, the possibility is presented to provide, a program for use of a decision logic to display a traffic sign for such a duration until a predetermined road distance has been traveled. This predetermined road distance is preferably classification-specific and can be made available using a memory unit or hard drive. For example, in Germany the changing of streets is implicitly associated with the lifting of restrictions, such as speed limit restrictions. In addition, speed limits must be repeated at least every 3 km, otherwise they are presumed to be rescinded. By this characteristic according to the invention it is achieved, that a traffic sign can be displayed only as long as absolutely necessary even without the regulation being explicit rescinded.

What is claimed is:

1. A process for recognizing and displaying traffic signs, comprising:
    analyzing and classifying image data from an image sensor in an information processing unit,
    on the basis of the results of the classification, storing image segments and/or a symbolic image representing image data in a memory unit, and
    displaying this by means of a display unit,
    wherein in the framework of the analysis in the information processing unit it is determined whether the image data from the image sensor contains one or more objects which, with sufficient confidence, are traffic signs, and subsequently supplies these objects to a further processing and classification comprising:
        separating the image data of the objects, in the data processing, into traffic sign specific upper classes and lower classes,
        extracting, during the separation, appropriate class, specific characterizing data,
        supplying the class-specific characterizing data to separate classifications,
        replacing the class-specific characterizing data, if they have been correctly recognized with high confidence by the classification system, by appropriate image data representing the symbolic representation stored in a memory unit, or by the appropriate original image data originating from the image sensor, and
        synthesizing the image data resulting from this replacement into a synthetic image of a traffic sign, storing this image in the memory unit, and bringing it to display in the display unit.

2. A process according to claim 1, wherein the classification occurs hierarchically, in multiple classification steps.

3. A process according to claim 1, wherein the classification steps are essentially set up as follows:
    a) first, only the characterizing data associated with the upper class of the object is supplied to a classifier,
        aa) upon successful classification, wherein the class is recognized correctly with a high degree of confidence, replacing the characterizing data with the appropriate symbolic representation of the upper class stored in the memory unit,
        ab) upon unsuccessful classification, wherein the class could not be correctly recognized with a high degree of confidence, replacing the characterizing data for the upper class and the charactering data for the lower class with the corresponding original image data originating from the image sensor,
    b) if the classification of the upper class was successful, then subsequently the characterizing data associated with the lower class of the object are supplied to a classifier,
        ba) upon successful classification, wherein the class is recognized with a high degree of confidence, the characterizing data are replaced by the appropriate symbolic representation of the lower class stored in the memory unit,
        bb) upon unsuccessful classification, wherein the class could not be correctly recognized with a high degree of confidence, the characterizing data for the lower class are substituted by the original image data from the image sensor.

4. A process according to claim 1, wherein the classifiers employed in the classification are trained using multiple learning samples.

5. A process according to claim 1, wherein the classifiers used in the classification make decisions on the basis of a comparison of the distance of the characterizing data supplied to them from the class-typical characterizing data sets stored in the memory unit.

6. A process according to claim 1, wherein, in the case that in the framework of the analysis of the image data from the image sensor a supplemental sign is recognized attached to the traffic sign, and when during the classification at least the upper class of the traffic sign is recognized with high confidence, this supplemental sign is displayed on the display unit.

7. A process according to claim 1, wherein in the case that in the framework of the classification at least the upper class of a traffic sign has been recognized, the respective image data which originated from the area of the environment of the traffic sign in which a supplemental sign is typically located is displayed by means of the display unit.

8. A process according to claim 7, wherein the display of the image data is subjected to a pre-classification, which rejects obviously useless image information and does not forward this to the display.

9. A process according to claim 1, wherein in the framework of the analysis in the information processing unit, during which it is determined whether an image contains one or more objects which with sufficiently high confidence are traffic signs, this is divided into two process steps, wherein
    a) in a first process step image areas are determined which contain traffic signs with an above-average degree of confidence, and
    b) in a second process step objects possessing a predetermined shape are determined within these image areas by means of geometric analysis.

10. A process according to claim 9, wherein said first process step is carried out on the basis of color values and/or spatial positions, and wherein said second process step is carried out by means of a correlation processes.

11. Process according to claim 9, wherein said shape is round or triangular.

12. A process according to claim 1, wherein said system is carried onboard a vehicle,
    wherein a sequence of images is recorded of a recognized object as a vehicle drives once past the traffic sign, from which sequence respectively the best image is selected,
    wherein the selection is carried out on the basis of defined quality criteria, and only the synthesized traffic sign image generated on the basis of this best image is stored in the memory unit and displayed on the display unit.

13. A process according to claim 12, wherein said defined quality criteria include size, contrast, and brightness of the object recognized to be a traffic sign.

14. A process according to claim 1, wherein during the combination of the image data into a synthesized image of a traffic sign, the respective image data, which corresponds to the image data originally originating from the image sensor, are processed for improvement with respect to a better recognizability, in such a manner that they are standardized with respect to at least one of:
    a) size,
    b) contrast,
    c) intensity, and
    d) color shade.

15. A process according to claim 1, further comprising determining the position of one of the objects recognized to be a traffic sign by means of a position determining unit.

16. A process according to claim 1, wherein the display unit is so controlled by the information processing unit via a program for using a decision logic stored in the memory unit, that it displays the synthesized image of a traffic sign only until a new object is recognized as a traffic sign, at which time the simplified representation of the new traffic sign replaces the previous image.

17. A process according to claim 1, wherein the maximal duration of the display of the synthesized image of a traffic sign is adjusted by means of an adjustment unit included in the display unit.

18. A process according to claim 1, wherein the system is carried onboard a vehicle, wherein the traveled distance between the actual vehicle position and the position of the last recognized traffic sign of a particular class of traffic signs is determined via a program in the memory unit and with the aid of a device or sensor coupled to the information unit.

19. A process according to claim 18, wherein the determination of the distance occurs by means of a vehicle tachometer coupled to the information unit or a wheel sensor for determining the traveled distance and a clock signal producer.

20. A process according to claim 18, wherein the data transmission of the devices coupled to the information unit and the sensors for determining the traveled distance occur via a vehicle on-board data bus.

21. A process according to claim 18, wherein, via a program stored in the memory unit, a decision logic is controlled via which the information processing unit controls the display unit in such a manner that it displays the synthesized image of the traffic sign so long, until a predetermined traveled path stored in the memory unit is traveled, which is preferably class-specific.

22. A device according to claim 18, wherein in the memory unit a program is stored for application of a decision logic by means of which the information processing unit so controls the display unit, that the synthesized image of a traffic sign is display so long, until a travel distance preset in the memory unit has been traveled, which is preferably class specific.

23. A process according to claim 1, further comprising controlling a decision logic via a program stored in the memory unit by means of which the information processing unit directs the display unit in such a manner, that it displays the synthesized image of a traffic sign so long, until a new object is recognized as a traffic sign, optionally including recognizing whether the a traffic sign is of the same or a corresponding class, and replaces the previous one with the simplified representation of the new one.

24. A process according to claim 1, further comprising emitting an acoustic signal via an acoustic signal emitter within the display unit as soon as an object is recognized as a traffic sign, wherein said acoustic signal is optionally class-specific.

25. A process according to claim 1, wherein said system is carried onboard a vehicle, wherein by a suitable arrangement of one or more digital cameras within the digital image sensor, all relevant traffic signs for a vehicle along a traveled path are detected independent of the horizontal and/or vertical tilting of the vehicle path.

26. A process according to claim 25, wherein said digital cameras are monochromic.

27. A process according to claim 1, wherein the system for recognizing and displaying traffic signs utilizes information which originated from at least one map-based navigation system and/or a traffic information system.

28. A process according to claim 27, wherein the system for recognizing and displaying traffic signs communicates with the map-based navigation system and/or traffic information system via an on-board vehicle data bus.

29. A process according to claim 27, wherein the system for traffic sign recognition begins to operate at a higher level of performance when on the basis of map-based information it is recognized that the vehicle is passing through an area in which the recognition of traffic signs may be problematic.

30. A process according to claim 29, wherein within said problematic areas supplemental subdivided recognition processes are carried out, in such a manner that
    a) in the area of community entrances and community exits there is a specific search for signs indicating entry of a community and departing of a community,
    b) in the area of traffic influencing facilities, changing signs or traffic lights, separately attention is paid to a change in the type and manner of the representation of the traffic sign, c) in an area, in which poor visibility due to fog or rain is present and a higher probability of contrast-poor images is likely, an increase in the contrast enhancement of the image data is effected.

31. A process according to claim 27, wherein in a data memory unit integrated in the overall system, in addition to or complimentary to possibly already existing information, at least one of the type, the position, the condition, the visibility and the size of a recognized traffic sign is stored.

32. A process according to claim 31, wherein by means of a signal producer contained in the display unit, an acoustic or optical signal is emitted when a change with respect to the position or a change as to the presence or absence of a traffic sign occurs along a previously traveled road segment.

33. A process according to claim 27, wherein information from the map-based navigation system is drawn upon to determine the length of a road segment traveled by the vehicle.

34. A process according to claim 1, wherein a data memory unit is integrated in the overall system, in which, additionally or complimentary to possibly already existing information, at least one of the type, the position, the condition, the visibility and the size of a recognized traffic sign is recorded.

35. A process according to claim 34, wherein the display unit includes a signal emitter which emits an acoustic or optical signal when, while traveling along a path previously traveled at least once, a change with respect to the position or the presence or absence of a traffic sign occurs.

36. A process according to claim 1, wherein said system is carried onboard a vehicle, and wherein the information from the map-based navigation system is utilized in order to determine the distance of a road segment traveled by the vehicle.

37. A device for recognizing and displaying a traffic sign, comprising
a) an image sensor,
b) an information processing unit, comprised of an analyzer, a supplemental processing unit and a classifier for processing image data supplied by the image sensor,
c) a memory unit, which contains symbolic images representing image data, and in which image segments and/or symbolic images representing image data are stored by the information processing unit on the basis of the results of information supplied by the classifier, and
d) a display unit, upon which the image data stored in the memory unit can be brought to display,
wherein the analyzer is programmed to determine whether an image contains one or more objects which with high probability are traffic signs, and as a result thereof to supply this to the classifier,
wherein that the supplemental processing unit includes a separator, which separates the image data supplied to the analyzer into traffic sign specific upper classes and lower classes and extracts class specific characterizing data, which are subsequently supplied to a classifier,
wherein the classifier included in the information processing unit is constructed in such a manner, that the class-specific characterizing data, depending upon whether it has been recognized correctly by the classifier with high degree of confidence, is replaced by image data of representative symbolic images stored in the memory unit or the appropriate original image data originating from the image sensor, and wherein the information processing unit includes an element for combination of image data, which combines the image data resulting from this replacement into a synthetic image of a traffic sign and stores this image in the memory unit, and by means of the display unit causes this to be displayed.

38. A device according to claim 37, wherein the classifier contained in the information processing unit is organized hierarchically, in multiple steps.

39. A device according to claim 38, wherein the hierarchical classifier contains a first classification step, which is carried out hierarchically, for identifying the upper class of the traffic sign, and contains a second classification step, which is organized hierarchically, for identifying the lower class of the traffic sign.

40. A device according to claim 37, wherein the classifier contained in the information unit is so designed, that it can be trained by multiple learning samples.

41. A device according to claim 37, wherein the classifier contained in the information unit is so designed, that it makes a decision on the basis of a comparison of distance measurements of (a) the characterizing data supplied to it and (b) the class typical characterizing data sets stored in the memory unit.

42. A device according to claim 37, wherein the display unit is so designed, that in the framework of the analysis of the image data from the image sensor a supplemental sign associated with the traffic sign can be displayed, when during the classification at least the upper class of the traffic sign is recognized with high probability.

43. A device according to claim 37, wherein the display unit is so designed, that in the case that in the framework of the classification at least the upper class of the traffic sign is recognized, the respective image data is displayed which originated from that area of the environment of the traffic sign in which supplemental signs are typically located.

44. A device according to claim 43, wherein in the display unit a classifier is provided, which rejects obviously useless image information and prevents the display thereof.

45. A device according to claim 37, wherein said device is carried onboard a vehicle, wherein the device additionally includes a comparator programmed to select the best image from a sequence of images taken as the vehicle moves past an object recognized as a traffic sign, wherein the comparator is programmed to carry out the selection on the basis of defined quality criteria, and causes the information processing unit to display the generated synthetic image of a traffic sign based only upon this best image, to store this in the memory unit, and to display this in the display unit.

46. A device as in claim 45, wherein said quality criteria is size and/or contrast and/or intensity of the object recognized as a traffic sign.

47. A device according to claim 37, wherein the unit for combining image data during the generation of a synthetic image of a traffic sign is programmed to process the respective image data which corresponds to the image data originally originating from the image sensor, processing these with respect to an improved recognizability, in such a manner that they are standardized in at least one of:
a) size,
b) intensity,
c) brightness, and
d) color tone.

48. A device according to claim 37, wherein the device additionally includes a position determining unit for determining the position of an object recognized as a traffic sign.

49. A device according to claim 37, wherein a program is stored in the memory unit for use as a decision logic by means of which the information processing unit controls the display unit in such a manner that the synthetic image of a traffic sign is displayed so long until a new object can be recognized as a traffic sign, and the simplified representation of the new object replaces the previous one.

50. A device according to claim 37, further including an adjustment unit associated with the display device, by means of which the maximal duration of the display of the synthetic image of the traffic sign can be adjusted.

51. A device according to claim 37, wherein said device is carried onboard a vehicle, wherein a program is stored in the memory unit, which with the aid of devices or sensors coupled to the information unit determines the distance covered between the actual position of the vehicle and the position of the last recognized traffic sign of a particular class of traffic signs.

52. A device according to claim 51, wherein for determining the traveled distance a vehicle tachometer or a wheel sensor for determining the covered distance and a time clock are coupled to the information unit.

53. A device according to claim 51, wherein the devices and sensors coupled to the information unit for determining the covered distance are coupled via an onboard vehicle data bus.

54. A device according to claim 37, wherein a program is stored in the memory unit for application of a decision logic by means of which the information processing unit controls the display unit in such manner, that it displays the synthetic image of the traffic sign so long, until a new object can be recognized as a traffic sign, optionally including determining whether the traffic sign is of the same or a corresponding class, and the simplified representation thereof replaces the preceding one.

55. A device according to claim 37, wherein the display unit additionally includes an acoustic signal emitter, which, as soon as an object has been recognized as a traffic sign, emits an acoustic signal, which may optionally be a class specific acoustic signal.

56. A device according to claim 37, wherein said device is carried onboard a vehicle, wherein the digital image sensor includes one or more digital cameras, which are arranged in such a manner, that their composite or total image field suffices to detect all of the traffic signs relevant to the traveled path of the independent of the horizontal and/or vertical tilting of the path.

57. A device according to claim 56, wherein said digital cameras are monochrome.

58. A device according to claim 37, wherein the system for recognizing and displaying traffic signs is connected to at least one of a map-based navigation system and a traffic information system, in order to utilize information originating therefrom.

59. A device according to claim 58, wherein a connection exists, via an onboard vehicle data bus, between the systems for recognizing and displaying of traffic signs the a map-based navigation system or traffic information system.

60. A device according to claim 58, wherein the system for traffic sign recognition is capability of operating at an increased performance when it is recognized, on the basis of map-based information, that the vehicle is passing through an area in which the recognition of traffic signs may be problematic.

61. A method for enhancing the safety of a vehicle in operation, said method comprising providing to the operator of said vehicle a memory aid, said memory aid, obtained by operating an onboard system designed to analyze and classify image data from an image sensor in an information processing unit, on the basis of the results of the classification, store image segments and/or a symbolic image representing image data in a memory unit, and display this by means of a display unit, wherein in the framework of the analysis in the information processing unit it is determined whether the image data from the image sensor contains one or more objects which, with sufficient confidence, are traffic signs, and subsequently supplies these objects to a further processing and classification comprising:

separating the image data of the objects, in the data processing, into traffic sign specific upper classes and lower classes, extracting, during the separation, appropriate class-specific characterizing data, supplying the class-specific characterizing data to separate classifications, replacing the class-specific characterizing data, if they have been correctly recognized with high confidence by the classification system, by appropriate image data representing the symbolic representation stored in a memory unit, or by the appropriate original image, data originating from the image sensor, and synthesizing the image data resulting from this replacement into a synthetic image of a traffic sign, storing this image in the memory unit, and bringing it to display in the display unit.

62. A method as in claim 61, wherein said method involves operating said system for inspection of regulated traffic routes.

* * * * *